US008675713B2

(12) United States Patent
Martin et al.

(10) Patent No.: US 8,675,713 B2
(45) Date of Patent: Mar. 18, 2014

(54) SATELLITE-BASED POSITIONING SYSTEM RECEPTION DEVICE COMPRISING A FUNCTION FOR DETECTING FALSE LOCK-ONS

(75) Inventors: Nicolas Martin, Bourg les Valence (FR); Bernard Fouilland, Fauconnieres (FR); Hervé Guichon, Guilherand (FR)

(73) Assignee: Thales, Neuilly sur Seine (FR)

( * ) Notice: Subject to any disclaimer, the term of this patent is extended or adjusted under 35 U.S.C. 154(b) by 81 days.

(21) Appl. No.: 13/464,766

(22) Filed: May 4, 2012

(65) Prior Publication Data

US 2012/0281735 A1  Nov. 8, 2012

(30) Foreign Application Priority Data

May 5, 2011  (FR) ...................................... 11 01391

(51) Int. Cl.
*H04B 1/00* (2006.01)
(52) U.S. Cl.
USPC ........................................................ 375/150
(58) Field of Classification Search
USPC ......... 375/140, 146, 147, 148, 150, 284, 343; 342/357.02, 357.59, 357.61, 357.63
See application file for complete search history.

(56) References Cited

U.S. PATENT DOCUMENTS

| | | | |
|---|---|---|---|
| 5,850,420 A | 12/1998 | Guillard | |
| 5,949,815 A | 9/1999 | Pon | |
| 2002/0131480 A1* | 9/2002 | Sousa et al. | 375/147 |
| 2005/0248483 A1* | 11/2005 | Martin | 342/357.02 |
| 2006/0215739 A1* | 9/2006 | Williamson et al. | 375/149 |
| 2007/0109189 A1* | 5/2007 | Jia et al. | 342/357.15 |
| 2007/0201537 A1* | 8/2007 | De Wilde et al. | 375/147 |
| 2008/0151971 A1* | 6/2008 | Mo et al. | 375/150 |
| 2009/0046766 A1* | 2/2009 | Avellone et al. | 375/142 |
| 2009/0213912 A1* | 8/2009 | Brenner | 375/150 |
| 2010/0135364 A1* | 6/2010 | Hodgart | 375/147 |

FOREIGN PATENT DOCUMENTS

| | | |
|---|---|---|
| EP | 0767388 A1 | 4/1997 |
| EP | 1734377 A1 | 12/2006 |
| FR | 2739695 A1 | 4/1997 |

OTHER PUBLICATIONS

Aleksandar Jovanovic, et al., "Multipath Mitigation Techniques for CBOC, TMBOC and AltBOC Signals Using Advanced Correlators Architectures", 2010 IEEE /ION Position Location and Navigation Symposium, May 4, 2010, pp. 1127-1136, Piscataway, NJ, USA, XP031707007.

\* cited by examiner

*Primary Examiner* — Jaison Joseph
*Assistant Examiner* — Syed Haider
(74) *Attorney, Agent, or Firm* — Baker Hostetler LLP

(57) ABSTRACT

A satellite-based positioning system reception device comprises a function for detecting false lock-ons based on a linear combination of complex signals arising from correlation pathways between a signal received from a satellite and a prompt local code and a plurality of local codes shifted by determined delays with respect to the prompt local code. An advantage is that the function for detecting false lock-ons makes it possible to remedy the false lock-ons due to multipath phenomena.

13 Claims, 4 Drawing Sheets

SATELLITE-BASED POSITIONING SYSTEM RECEPTION DEVICE COMPRISING A FUNCTION FOR DETECTING FALSE LOCK-ONS

CROSS-REFERENCE TO RELATED APPLICATION

This application claims priority to foreign French patent application No. FR 1101391, filed on May 5, 2011, the disclosure of which is incorporated by reference in its entirety.

FIELD OF THE INVENTION

The present invention relates to a satellite-based positioning system reception device comprising a function for detecting false lock-ons. It applies notably to satellite-based radionavigation systems, commonly designated according to the initials GNSS designating the English terminology "Global Navigation Satellite System", and may be implemented in any navigation receiver.

BACKGROUND

A satellite-based positioning system or GNSS, comprises a plurality of signal emitters arranged on as many satellites forming a constellation. A minimum of four positioning satellites enable a mobile receiver that can process the signals received from them, to deliver position data for the receiver, in terms of geographical coordinates (x,y,z) at a determined instant t. The signals transmitted by the positioning satellites occupy a wider bandwidth than that required by the throughput of data to be transmitted, with the aim of reducing the influence of the interfering signals, and of reducing the spectral power density of the signals transmitted in such a way that the latter are masked in the background noise. Thus, according to techniques which are in themselves known, the spectrum of the transmitted signals is spread, a carrier wave being modulated by a data signal overlaid on a pseudo-random noise spreading signal with high frequency, according to a periodic sequence specific to each satellite.

According to these techniques, the satellite-based positioning, determined at the level of the receiver, consists firstly in detecting, in an acquisition step, the pseudo-random spreading codes modulating the signals originating from the satellites. Each signal emitted by a visible satellite and received by the antenna of the receiver must then be demodulated by the receiver, so as to determine notably a propagation time measurement and Doppler measurement.

Calculation means implemented in the receiver then make it possible to synchronize, on the satellite signals received, locally generated replicas of these signals. Slaving is undertaken by a carrier loop, steering the phase of the local carrier, and by a code loop steering the position, or phase, of the local code. This synchronization enables the receiver to evaluate the propagation times of the signals originating from the various satellites, and to deduce therefrom its position, by also taking into consideration navigation data contained in the signals.

An acquisition phase typically makes it possible to initialize the operation of the tracking loops, since neither the position, nor the Doppler frequency nor the code received are known a priori; but the tracking loops can operate only if the position of the code and the Doppler frequency are close to those of the useful signal of the satellite considered. If one of the differences is too high, then a zero correlation no longer provides any information, and slaving may not be achieved.

To carry out the acquisition phase, a search for a correlation peak is performed between a local signal and the signal received, in a two-dimensional space, by trying a plurality of assumptions regarding the phase of the code and the value of the Doppler frequency, with a sufficiently fine interval to allow detection of the correlation peak. As soon as a correlation peak has been found, the search for the code and for the Doppler frequency may be refined by decreasing the search interval around the detected correlation peak. When the precision obtained is considered to be sufficient, the loops are closed, and converge by construction to the correlation maximum: a so-called "tracking" phase is then entered.

A major cause of positioning errors is related to the presence of multiple paths or "multi-paths" on the signals emitted by the satellites. This phenomenon is related to the reflection of the waves off obstacles, for example buildings, the signal received then being a composite signal consisting of direct signals and reflected signals.

With the aim of reducing multi-path errors, it is possible to resort, according to a technique in itself known, to a so-called "Double Delta" correlator. This solution is presented in the French patent published under the reference FR 2739695, and is described in detail hereinafter. However, this solution presents a risk of false lock-ons, leading to significant or indeed unacceptable positioning errors, up to an order-of-magnitude of a few tens of meters.

A risk of false lock-on is due to the existence of blind zones on the Double Delta code discriminator used for the code loop. If the code error falls within a blind zone in which the code discriminator is zero, the code loop switches to open loop, thereby leading to a static measurement error in the pseudo-range.

Such a risk also exists with other code discriminators exhibiting blind zones.

SUMMARY OF THE INVENTION

An aim of the present invention is to remedy at least the aforementioned drawbacks, by proposing a satellite-based positioning device comprising a function for detecting false lock-ons, making it possible notably to remedy the problems of false lock-ons due to a correlator of Double Delta type or any code discriminator exhibiting blind zones. It should be noted in this respect that in the examples developed hereinafter, reference is made to a correlator of Double Delta type, it being understood that the examples could also apply to other types of code discriminators exhibiting blind zones.

For this purpose, the subject of the invention is a satellite-based positioning system reception device, comprising at least one reception channel configured to process a received digitized signal originating from a microwave signal emitted by a determined satellite offering an inherent spreading code, each reception channel comprising at least:
  means for generating a local carrier,
  means for demodulating the received digitized signal by the local carrier,
  means for generating a punctual local code corresponding to the said satellite spreading code, the generating means also generating a plurality n of local codes shifted with respect to the punctual local code by nonzero delays $d_i$,
  correlation means configured to determine signals representative of coefficients of correlation between the signal received demodulated by the local carrier and the local codes forming as many correlation pathways, the signals restored by the said correlation means being processed by a correlation integrator providing complex signals $Z_i$ corresponding to respective correlation pathways, the reception device being characterized in that each reception channel furthermore comprises means for determining a function for detecting false lock-ons which is determined on the basis of the said complex signals according to the relation:

$$\text{Detector} = \frac{\text{Re}[Z_I \cdot \bar{Z}_P]}{\|Z_P\|^2},$$

in which $Z_P$ designates the complex signal arising from the pathway for correlating the digitized signal received with the punctual local code, and $Z_I$ designates a linear combination of the said complex signals $Z_i$ associated with respective weighting coefficients $\alpha_i$, the said delays $d_i$ and weighting coefficients $\alpha_i$ satisfying the following relation:

$$\begin{cases} \sum_{i=1}^{i=n} \alpha_i = 0 \\ \sum_{i=1}^{i=n} d_i \cdot \alpha_i = 0. \end{cases}$$

In one embodiment of the invention, a correlation integrator can process the signals restored by the said correlation means for a plurality of determined correlation pathways, the complex signals Zi arising from the correlation integrator being processed by at least one code discriminator providing a signal controlling a code loop, a plurality of the signals from among the complex signals Zi being utilized by the function for detecting false lock-ons.

In one embodiment of the invention, the reception device can comprise five correlation pathways:
- a punctual correlation pathway devised on the basis of the prompt local code,
- a late correlation pathway devised on the basis of a local code shifted from the prompt local code by a delay d,
- a very late correlation pathway devised on the basis of a local code shifted from the prompt local code by a delay 2d,
- an early correlation pathway devised on the basis of a local code shifted from the prompt local code by a delay −d and
- a very early correlation pathway devised on the basis of a local code shifted from the prompt local code by a delay −2d, the function for detecting false lock-ons being devised on the basis of the complex signals and defined according to the relation:

$$\text{Detector} = \frac{\text{Re}[(-Z_{TA} + 2 \cdot Z_P - Z_{TR}) \cdot \bar{Z}_P]}{\|Z_P\|^2}.$$

In one embodiment of the invention, the reception device can comprise five correlation pathways:
- a prompt correlation pathway devised on the basis of the prompt local code,
- a late correlation pathway devised on the basis of a local code shifted from the prompt local code by a delay d,
- a very late correlation pathway devised on the basis of a local code shifted from the prompt local code by a delay 2d,
- an early correlation pathway devised on the basis of a local code shifted from the prompt local code by a delay −d and
- a very early correlation pathway devised on the basis of a local code shifted from the prompt local code by a delay −2d, the code discriminator devising a signal $D_{code}$ formed by a linear combination of the complex signals, respectively designated $Z_P$, $Z_R$, $Z_{TR}$, $Z_A$, $Z_{TA}$ arising from the said correlation pathways according to the relation:

$$D_{code} = \frac{\text{Re}[\{2 \cdot (Z_A - Z_R) - (Z_{TA} - Z_{TR})\} \cdot \bar{Z}_P]}{\|Z_P\|^2},$$

the function for detecting false lock-ons being devised on the basis of the same complex signals and defined according to the relation:

$$\text{Detector} = \frac{\text{Re}[(-Z_{TA} + 2 \cdot Z_P - Z_{TR}) \cdot \bar{Z}_P]}{\|Z_P\|^2}.$$

In one embodiment of the invention, the reception device can furthermore comprise comparison means configured to compare the value of the said function for detecting false lock-ons with a threshold value.

In one embodiment of the invention, the reception device can comprise alert means, configured to be triggered when the said threshold value is crossed by the said function for detecting false lock-ons.

In one embodiment of the invention, the reception device can furthermore comprise switching means configured to activate a first code discriminator when the said function for detecting false lock-ons is below the said threshold value, or a second code discriminator when the said function for detecting false lock-ons is above the said threshold value.

In one embodiment of the invention, the reception device can furthermore comprise switching means configured to activate a second code discriminator when the said function for detecting false lock-ons exceeds a first threshold value, and to activate a first code discriminator when the said function for detecting false lock-ons drops back beneath a second threshold value below the said first threshold value.

In one embodiment of the invention, the said first code discriminator may be of narrow correlator type, and the said second code discriminator may be of Double Delta correlator type.

In one embodiment of the invention, the said threshold value or values may be predetermined values.

In one embodiment of the invention, the reception device can furthermore comprise means for estimating the signal-to-noise ratio of the signal received, the said threshold value or values possibly being adjusted as a function of the signal-to-noise ratio estimated by the said means for estimating the signal-to-noise ratio.

In one embodiment of the invention, the reception device can furthermore comprise noise filtering means which are applied to the function for detecting false lock-ons.

In one embodiment of the invention, the reception device can furthermore comprise means for estimating bias, formed by a second function for detecting false lock-ons which is determined on the basis of complex signals corresponding to additional correlation pathways formed on the basis of local codes shifted mutually and shifted with respect to the punctual local code by an advance or by a delay greater than 1 chip.

BRIEF DESCRIPTION OF THE DRAWINGS

Other characteristics and advantages of the invention will become apparent on reading the description, given by way of example, offered with regard to the appended drawings which represent.

DETAILED DESCRIPTION

The present invention proposes to dispose a specific correlator in parallel with the correlator of Double Delta type, with the aim of devising an indicator of false lock-on. This specific correlator vanishes when the code error lies in the blind zone, and reaches its nonzero maximum for a zero code error.

Thus when the indicator devised on the basis of this specific correlator goes for example below a certain threshold, a risk of false lock-on in a blind zone may be detected. In such a case it is possible to substitute temporarily for the correlator of Double Delta type, for example a narrow correlator, enabling the code error to converge to zero, until the indicator goes back above the threshold.

This solution exhibits the advantage of not affecting the performance of the Double Delta in any way, as long as the indicator remains above the threshold. The solution then allows fast convergence in the case of false lock-on.

Figure 1:
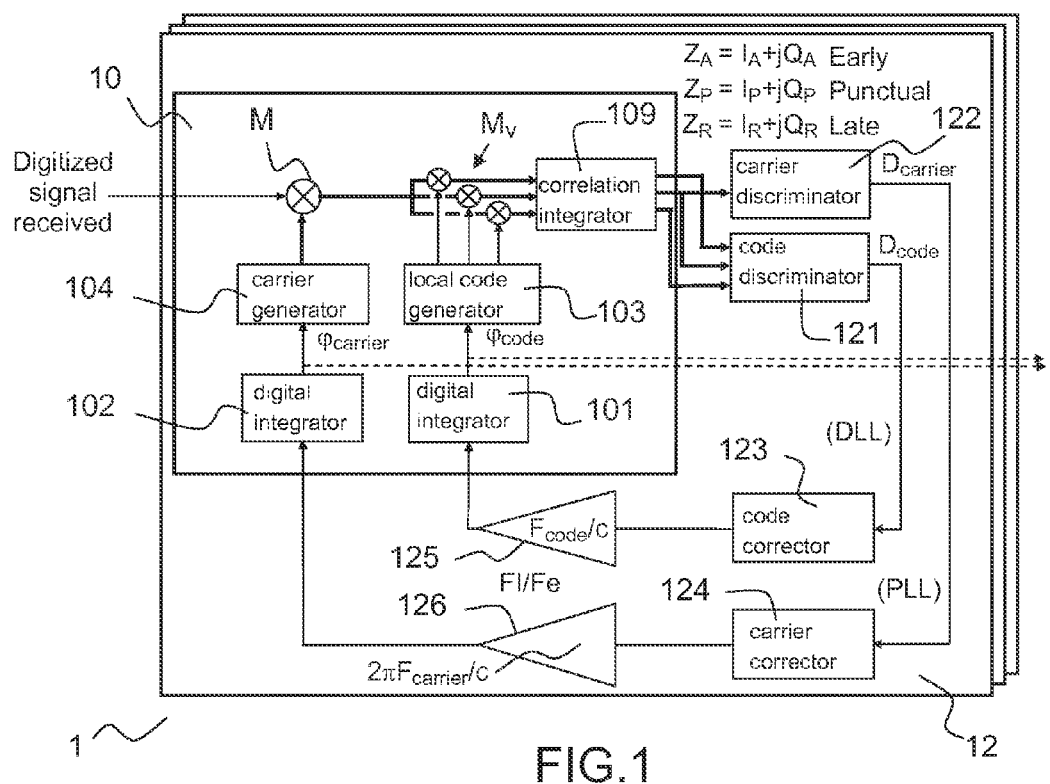
FIG. 1, a diagram illustrating by means of functional blocks, a digital processing channel of a satellite-based positioning receiver.

FIG. 1 presents a diagram illustrating by means of functional blocks, a digital processing channel of a satellite-based positioning receiver.

With reference to FIG. 1, a digital processing channel 1 receives as input digitized signals originating from a satellite. A satellite-based positioning system reception device typically comprises a digital processing channel for each satellite from which it receives a signal to be processed. For example, a reception device can comprise twelve channels, realized in a specific integrated digital electronic component of ASIC type (according to the acronym corresponding to the English terminology "Application Specific Integrated Circuit") or in a programmable digital component of FPGA type (according to the initials designating the English terminology "Field Programmable Gate Array"). A digital processing channel 1 comprises a hardware module 10 and a software module 12.

The hardware module 10 receives as input digitized signals originating from a reception chain disposed upstream, and not represented in the figure.

The hardware module 10 is configured to generate the local code and the local carrier, and to correlate them thereafter with the digitized input signal. It may be clocked at a relatively high frequency, for example of the order of 50 MHz. It comprises a local carrier phase digital integrator $NCO_P$ 102 generating on the basis of a first appropriate control signal the phase of the local carrier $\phi_{carrier}$. The phase of the local carrier $\phi_{carrier}$ allows the generation of a complex local carrier on the basis of a carrier generator 104. The hardware module 10 firstly allows demodulation of the carrier, by multiplication of the signal digitized by the complex local carrier, by means of a multiplier M.

The hardware module 10 also comprises a code phase digital integrator $NCO_C$ 101 controlled by a second appropriate control signal. The code phase digital integrator $NCO_C$ 101 is configured to generate a local-code phase $\phi_{code}$. The local-code phase $\phi_{code}$ controls a local-code generator 103 implementing the spreading code specific to the satellite to which the channel considered is dedicated. The hardware module 10 secondly allows demodulation of the code, by multiplication of the carrier-demodulated signal arising from the aforementioned multiplier M, by a local code managed by the local-codes generator 103. The local-code generator 103 can generate a plurality of local codes: the so-called "prompt" local code, as well as local codes advanced or delayed with respect to the prompt local code. In the example illustrated by FIG. 1, the local-codes generator 103 generates a prompt local code, a so-called "late" local code, corresponding to the prompt local code delayed by a delay d for example equal to 0.5 chips, and a so-called "early" local code, corresponding to the prompt local code advanced by the delay d.

Thus, the previously mentioned demodulation of the code may be carried out in parallel on various pathways corresponding to the various local codes generated, by means of a plurality of correlation multipliers Mv disposed in parallel. For example, in the case of a correlator of Double Delta type, the local-codes generator 103 can generate five local codes: a prompt local code, a late local code, an early local code, as well as a so-called "very late" local code corresponding to the prompt local code delayed by a delay 2xd, and a so-called "very early" local code corresponding to the prompt local code advanced by the delay 2xd.

The signals output by the correlation multipliers Mv can then be integrated in a coherent manner by a correlation integrator 109, producing samples of digitized signals forming the correlation pathways. In the example illustrated by FIG. 1, three correlation pathways thus arise from the correlation integrator 109: a prompt pathway, a late pathway and an early pathway, which can be formalized by complex signals, respectively: $Z_P = I_P + jQ_P$, $Z_R = I_R + jQ_R$ and $Z_A = I_A + jQ_A$. These complex correlation signals can then be utilized by the software module 12. Thus, the correlation integrator 109 may be clocked at a lower frequency, corresponding to the operating frequency of the software module 12, for example of the order of 50 Hz. In this way, the correlation integrator 109 carries out an integration every 20 ms; the latter may be an integrator with periodic reset to zero commonly designated according the English terminology "Integrate and Dump".

The software module 12 makes it possible to generate the control signals for the local carrier phase digital integrator $NCO_P$ 102 and for the code phase digital integrator $NCO_C$ 101, respectively via the slaving of a code loop DLL and of a carrier phase loop PLL.

The complex results arising from the correlation integrator 109 are used by the software module 12 to slave the phase of the local carrier and the phase of the local code, via the corresponding digital integrators 102, 101, in such a way that the local carrier is in phase with the carrier received, and that the local code of the prompt pathway is in phase with the code received, or stated otherwise that the code error is zero.

The code loop DLL comprises a code discriminator 121 receiving as input the various complex signals arising from the correlation pathways formed by the outputs of the correlation integrator 109, and providing as output a signal $D_{code}$ representative of an estimation of the code error $\tau$, that is to say of the difference between the phase of the code received $\phi_{code\_recvd}$ and the phase of the local code $\phi_{code\_local}$. The signal $D_{code}$ representative of the estimation of the code error is provided to a code corrector 123, the latter generating speed-related code commands, at the operating frequency of the software module 12, that is to say for example every 20 ms. The speed-related code commands are applied to the input of a code-commands amplifier 125 providing the second control signals in terms of number of chips per sampling period to the code phase digital integrator $NCO_C$ 101.

A phase digital integrator or NCO produces a phase, in cycles for the carrier, and in chips for the code. At each clock cycle or hech—1 hech corresponding to a sampling period, i.e. the inverse of the sampling frequency—the NCO increments the value of the phase by the value of the control signal that it receives. The control signal is thus expressed in cycles per hech or in chips per hech, calculated by the software module 12 on the basis of a speed in meters per second. Thus, the gain of the code-commands amplifier 125 can be written $G_{code}=(F_{code}/c)/F_e$, $F_{code}$ designating the frequency of the code, $F_e$ the sampling frequency and c the speed of light, and the gain of the carrier-commands amplifier 126 can be written $G_{carrier}=(F_{carrier}/c)/F_e$.

In a similar manner, the carrier phase loop PLL comprises a carrier discriminator 122 receiving as input the signal arising from the prompt correlation pathway formed by the corresponding output of the correlation integrator 109, and providing as output a signal $D_{carrier}$ representative of an estimation of the carrier phase error $\Delta\phi$, that is to say of the difference between the carrier phase of the signal received $\phi_{carrier\_recvd}$ and the local carrier phase $\phi_{carrier\_local}$. The signal $D_{carrier}$ representative of the carrier phase error is provided to a carrier corrector 124, the latter generating speed-related carrier commands, at the operating frequency of the software module 12. The speed-related carrier commands are applied to the input of a carrier-commands amplifier 126 providing the first control signals in terms of cycles per sampling period to the local carrier phase digital integrator $NCO_P$ 102.

The present invention relates particularly to the code discriminator 121. With a view to a better understanding of the present invention, notation designating various entities and physical variables is introduced hereinafter, as well as mathematical relations applying thereto.

For the rest of the account, the following notation is introduced:

$C_n(\phi_{code})$ designates the periodic spreading code of a satellite n;

$L_{code}$ designates the period of the code, in integer number of chips;

$T_{chip}$ designates the duration of a code slot—or chip—in seconds: thus the product $L_{code} \times T_{chip}$ designates the period of the code, in seconds;

$R(\tau)$ designates the auto-correlation function of the code, thus:

$R(\tau)=1-|\tau|$ if $|\tau|<1$,
$R(\tau)=0$ otherwise.

For a satellite n, $R(\tau)$ can also be written:

$$R(\tau) = R_{n,n}(\tau) = \frac{1}{L_{code}} \int_0^{L_{code}} C_n(u) \cdot C_n(u+\tau) du$$

For two satellites n and p, the inter-correlation coefficient can be written:

$$R_{n,p}(\tau) = \frac{1}{L_{code}} \int_0^{L_{code}} C_n(u) \cdot C_p(u+\tau) du,$$

this coefficient having a zero or almost zero value when p is different from n.

The signal received originating from a satellite at an instant t can be formulated according to the following relation:

$S_{recvd}(t)=2 \ A\cdot\cos(\phi_{carrier\_recvd}(t))C_n(\phi_{code\_recvd}(t))+\Sigma(t)$, A designating the amplitude of the signal received and $\Sigma(t)$ designating the signals originating from other satellites and from the noise.

The signal received can also be written according to the following relation:

$S_{recvd}(t)=A\cdot\exp i(\phi_{carrier\_recvd}(t))$
$C_n(\phi_{code\_recvd}(t))+A\cdot\exp i(-\phi_{carrier\_recvd}(t))C_n$
$(\phi_{code\_recvd}(t))+\Sigma(t)$ At an instant t, the local signals, respectively early, prompt and late, arising from the local-codes generator 103 can be formulated according to the following relations:

$$\begin{cases} S_{local\_early}(t) = \exp i(-\varphi_{carrier\_local}(t)) \cdot C_n(\varphi_{code\_local}(t)+d) \\ S_{local\_punctual}(t) = \exp i(-\varphi_{carrier\_local}(t)) \cdot C_n(\varphi_{code\_local}(t)) \\ S_{local\_late}(t) = \exp i(-\varphi_{carrier\_local}(t)) \cdot C_n(\varphi_{code\_local}(t)-d) \end{cases}$$

The sampled signals applied to the input of the correlation integrator 109, corresponding respectively to the early, prompt and late local signals can be written according to the following relations:

$$\begin{cases} Z_A(k) = \frac{1}{T} \int_{kT}^{(k+1)T} S_{recvd}(t) \cdot S_{local\_early}(t) \cdot dt \\ Z_P(k) = \frac{1}{T} \int_{kT}^{(k+1)T} S_{recvd}(t) \cdot S_{local\_punctual}(t) \cdot dt \\ Z_R(k) = \frac{1}{T} \int_{kT}^{(k+1)T} S_{recvd}(t) \cdot S_{local\_late}(t) \cdot dt \end{cases}, \text{ where:}$$

T designates the coherent integration time, in integer number of code periods.

The complex signals forming the correlation pathways respectively early, prompt and late can be written according to the following relations:

$$\begin{cases} Z_A = A \cdot \exp i(\Delta\varphi) \cdot R(\tau-d) + N \\ Z_P = A \cdot \exp i(\Delta\varphi) \cdot R(\tau) + N \\ Z_R = A \cdot \exp i(\Delta\varphi) \cdot R(\tau+d) + N \end{cases}, \text{ the term } N \text{ corresponding to the noise.}$$

$\Delta\varphi = \varphi_{carrier\_recvd} - \varphi_{carrier\_local}$  phase error, $\tau = \varphi_{code\_recvd} - \varphi_{code\_local}$  code error.

In the case of a correlator of Double Delta or equivalent type, very early and very late pathways may be added, the corresponding complex signals being formulated according to the following relations:

$$\begin{cases} Z_{TA} = A \cdot \exp i(\Delta\varphi) \cdot R(\tau - 2d) + N \\ Z_{TR} = A \cdot \exp i(\Delta\varphi) \cdot R(\tau + 2d) + N. \end{cases}$$

In the case of a "conventional" code discriminator, the characteristic representative signal $D_{code}$ may be defined according to the following relation:

$$D_{code} = \frac{\text{Re}[(Z_A - Z_R) \cdot \overline{Z}_P]}{\|Z_P\|^2}, \quad (1)$$

where:

Re[ ] designates the real part and $\overline{Z}$ designates the conjugate value of the complex Z.

By neglecting the noise term N introduced previously, it is possible to reformulate the representative signal $D_{code}$ according to the following relation:

$$D_{code} = \frac{R(\tau - d) - R(\tau + d)}{R(\tau)}. \quad (2)$$

Designating by $R_{Delta}(\tau)$ the numerator in relation (2) hereinabove, the latter can be written:

$$D_{code} = \frac{R_{Delta}(\tau)}{R(\tau)}. \quad (3)$$

The representative signal $D_{code}$ characteristic of a correlator of Double Delta type may be defined according to the following relation:

$$D_{code} = \frac{\text{Re}[(-Z_{TA} + 2 \cdot Z_A - 2 \cdot Z_R + Z_{TR}) \cdot \overline{Z}_P]}{\|Z_P\|^2}, \quad (4)$$

where:

Relation (4) hereinabove can also be written in the following manner:

$$D_{code} = \frac{\text{Re}[\{2 \cdot (Z_A - Z_R) - (Z_{TA} - Z_{TR})\} \cdot \overline{Z}_P]}{\|Z_P\|^2}. \quad (5)$$

By neglecting the noise term N introduced previously, it is possible to reformulate the representative signal $D_{code}$ according to the following relation:

$$D_{code} = \frac{2 \cdot (R(\tau - d) - R(\tau + d)) - (R(\tau - 2d) - R(\tau + 2d))}{R(\tau)}. \quad (6)$$

It should be noted that the value of d may be chosen typically less than 0.25 chips in the case of a correlator of Double Delta type.

Designating by $R_{Double\_Delta}(\tau)$ the numerator in relation (6) hereinabove, the latter can be written:

$$D_{code} = \frac{R_{Double\_Delta}(\tau)}{R(\tau)}. \quad (7)$$

The curves presented hereinafter are theoretical curves, all exhibiting a symmetry about the ordinate axis of the reference frames in which they are represented.

Figure 2A:
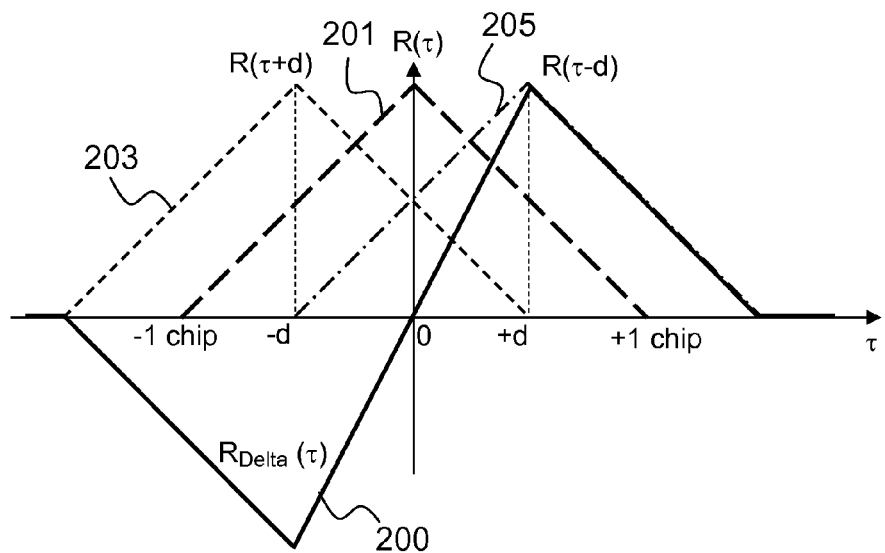
FIGS. 2a and 2b, curves illustrating the characteristics of the correlation function, respectively with a conventional correlator, and a correlator of Double Delta type.
Figure 2B:
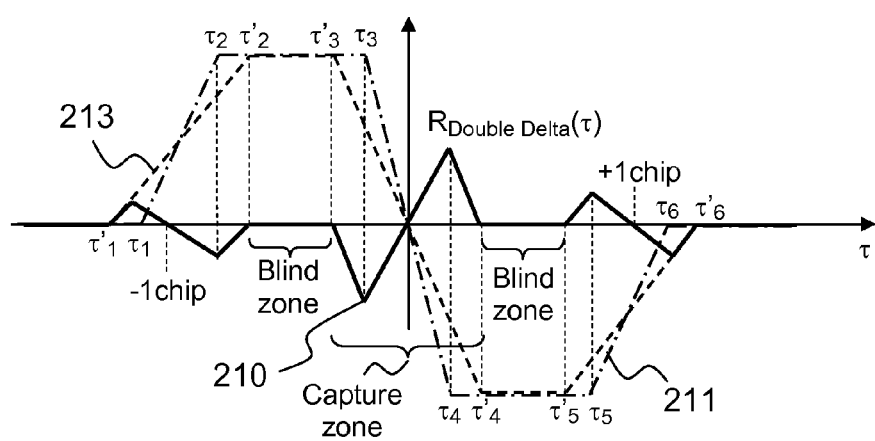

FIGS. 2a and 2b present curves illustrating respectively the characteristics of the correlation function: $R_{Delta}(\tau)$ with a conventional correlator, and $R_{Double\_Delta}(\tau)$ with a correlator of Double Delta type.

With reference to FIG. 2a, the latter presents a first curve 201 representing the inter-correlation coefficient R as a function of the code error $\tau$. The first curve 201 corresponds to a theoretical case, and exhibits a triangular shape, being characterized by a first linear zone increasing from a zero minimum value to a maximum value when the code error $\tau$ varies between −1 chip and 0, followed by a second linear zone decreasing down to a zero minimum value when the code error $\tau$ varies from 0 to 1 chip.

A second curve 203 represents the inter-correlation coefficient $R(\tau+d)$ corresponding to a late pathway. The second curve 203 is a translation by d=0.5 chips of the first curve 201 leftwards along the abscissa axis.

A third curve 205 represents the inter-correlation coefficient $R(\tau-d)$ corresponding to an early pathway. The third curve 205 is a translation by d=0.5 chips of the first curve 201 rightwards along the abscissa axis.

A curve $R_{Delta}(\tau)$ 200 represents the characteristic correlation function $R_{Delta}(\tau)$ of a conventional correlator, resulting from a difference between the first and second curves 203, 205 described hereinabove. The correlation function $R_{Delta}(\tau)$ exhibits a zero value for the values of the code error $\tau$ of less than or equal to −1.5 chips and greater than or equal to 1.5 chips. The curve $R_{Delta}(\tau)$ 200 exhibits a first linear zone decreasing from 0 to a minimum value, when the code error $\tau$ varies between −1.5 chips and −d=−0.5 chips, and then a second linear zone increasing from the minimum value to a maximum value, when the code error $\tau$ varies between −d=−0.5 chips and +d=+0.5 chips, the value of the correlation function $R_{Delta}(\tau)$ being zero when the code error $\tau$ is zero, and then a third linear zone decreasing from the maximum value to a zero value, when the code error $\tau$ varies between d=+0.5 chips and 1.5 chips. A conventional correlator exhibits the drawback of being very sensitive to multi-paths, inducing code errors of possibly greater than 100 meters.

Now with reference to FIG. 2b applying to a correlator of Double Delta type, this figure exhibits a first curve 211 representing the difference between the inter-correlation coefficient corresponding to the late pathway $R(\tau+d)$ and the inter-correlation coefficient corresponding to the early pathway $R(\tau-d)$ as a function of the code error $\tau$, this difference corresponding to the first term in the expression for the correlation coefficient $R_{Double\_Delta}(\tau)$ given in relation (6) hereinabove. The first curve 211 is characterized by a first zone, short of a first value $\tau_1$ equal to $-1-d$ of the code error $\tau$ in the example illustrated by the figure, in which the function represented is zero. The first curve 211 then presents a first linear zone increasing up to a maximum value, when the code error $\tau$ varies from the said first value $\tau_1$ up to a second value $\tau_2$ equal to $-1+d$, in the example illustrated by the figure. The first curve 211 then exhibits a first positive plateau, when the code error $\tau$ varies between the said second value $\tau_2$ and a third value $\tau_3$ equal to $-d$ in the example illustrated by the figure. The first positive plateau is followed by a second linear zone decreasing from the maximum value down to an opposite minimum value y, when the code error $\tau$ varies between the said third value $\tau_3$ and a fourth value $\tau_4$ equal to opposite $+d$, the function represented by the first curve 211 taking a zero value when the code error $\tau$ is zero. The second decreasing linear zone is followed by a second plateau at the negative minimum value, when the code error $\tau$ varies from said fourth value $\tau_4$ to a fifth value $\tau_5$ equal to $1-d$, the opposite of the said second value $\tau_2$. The second plateau is followed by a third linear zone increasing from the negative minimum value up to 0, when the code error $\tau$ varies between the said fifth value $\tau_5$ and a sixth value $\tau_6$ equal to $1+d$, the opposite of the said first value $\tau_1$. In the zone situated beyond the said sixth value $\tau_6$ along the abscissa axis, the function represented by the first curve 211 takes a zero value again.

A second curve 213 represents the difference between the inter-correlation coefficient corresponding to the very late pathway $R(\tau+2d)$ and the inter-correlation coefficient corresponding to the very early pathway $R(\tau-2d)$ as a function of the code error $\tau$, this difference corresponding to the second term of the expression for the correlation coefficient $R_{Double\_Delta}(\tau)$ given in relation (6) hereinabove. The global shape of the second curve 213 is similar to that of the first curve 211 described previously, in that the second curve 213 also exhibits three linear zones: a first linear zone increasing from 0 to the positive maximum value when the code error $\tau$ varies between a first value $\tau'_1$ equal to $-1-2.d$ and a second value $\tau'_2$ equal to $-1+2.d$, a second linear zone decreasing from the positive maximum value to the opposite negative minimum value when the code error $\tau$ varies between a third value $\tau'_3$ equal to $-2.d$ and a fourth value $\tau'_4$ equal to opposite $+2.d$, and a third linear zone increasing from the negative minimum value to zero when the code error $\tau$ varies between a fifth value $\tau'_5$ equal to $+1-2.d$ and a sixth value $\tau'_6$ equal to $+1+2.d$. The second curve 213 also exhibits a first plateau and a second plateau, the first plateau being at the positive maximum value, and extending from the second value $\tau'_2$ to the third value $\tau'_3$, and the second plateau being at the negative minimum value, and extending from the fourth value $\tau'_4$ to the fifth value $\tau'_5$, the function represented by the second curve 213 taking a zero value short of the first value $\tau'_1$ and beyond the sixth value $\tau'_6$. The second curve 213 is distinguished from the first curve 211 in that the first value $\tau'_1$ specific to the second curve 213 is lower than the first value $\tau_1$ specific to the first curve 211, the second value $\tau'_2$ specific to the second curve 213 is greater than the second value $\tau_2$ specific to the first curve 211, the third value $\tau'_3$ specific to the second curve 213 is lower than the third value $\tau_3$ specific to the first curve 211, the fourth value $\tau'_4$ specific to the second curve 213 is greater than the fourth value $\tau_4$ specific to the first curve 211, the fifth value $\tau'_5$ specific to the second curve 213 is lower than the fifth value $\tau_5$ specific to the first curve 211, and the sixth value $\tau'_6$ specific to the second curve 213 is greater than the sixth value $\tau_6$ specific to the first curve 211.

A curve $R_{Double\_Delta}(\tau)$ 210 represents the characteristic correlation function $R_{Double\_Delta}(\tau)$ of a Double Delta correlator, resulting from a difference between the second and first curves 213, 211 described hereinabove.

The central part of the curve $R_{Double\_Delta}(\tau)$ 210, on either side of the ordinate axis of the reference frame, exhibits globally the same shape as the characteristic curve of the correlation function $R_{Delta}(\tau)$ illustrated in FIG. 2a by the curve $R_{Delta}(\tau)$ 200. The zone corresponding to this central part is termed the "capture zone". A specific feature and an advantage of a correlator of Double Delta type is related to the fact that the correlation function $R_{Double\_Delta}(\tau)$ takes a zero value in blind zones coinciding with the plateaus exhibited by the second curve 213 described previously. An advantage afforded by these blind zones is that signals arising from multi-path phenomena exhibiting a delay encompassed within a blind zone, do not affect the code discriminator, and therefore have no effect on the code error. Thus, a correlator of Double Delta type allows an insensitivity to multi-paths whose delay is greater than 2.d. It should be observed that beyond the blind zones, the discriminator enters an unstable zone, bringing the code error back within the blind zone if the absolute value of the code error is lower than 1 chip, and pushes outside otherwise. For code errors of greater than $1+2d$ chips in absolute value, the correlation now provides only noise: the positioning receivers can comprise a signal-to-noise ratio estimator advantageously making it possible to detect such cases and to relaunch an acquisition process.

According to a specific feature of the present invention, it is proposed to use the existing correlation pathways so as to devise a function for detecting false lock-ons. The function for detecting false lock-ons may be constructed, in the manner of a code discriminator, on the basis of a combination of the correlation pathways.

For example, it is possible, in a particular embodiment of the invention, to devise the function for detecting false lock-ons by using a linear combination of the pathways on which a correlator of Double Delta type is founded, that is to say on the basis of the three pathways, very early, prompt and very late. This particular embodiment exhibits the advantage of using the same correlation pathways as those used by the correlator of Double Delta or equivalent type, for tracking.

The function for detecting false lock-ons can according to this particular exemplary embodiment be regarded as a value formulated according to the following relations:

$$\text{Detector} = \frac{\text{Re}[(-Z_{TA} + 2 \cdot Z_P - Z_{TR}) \cdot \bar{Z}_P]}{\|Z_P\|^2}. \tag{8}$$

By neglecting the noise, relation (8) hereinabove may be reformulated in the following manner:

$$\text{Detector} = \frac{-(R(\tau - 2d) - +2 \cdot R(\tau) - R(\tau + 2d))}{R(\tau)}, \tag{9}$$

or equivalently:

$$\text{Detector} = \frac{2 \cdot R(\tau) - (R(\tau - 2d) + R(\tau + 2d))}{R(\tau)}. \tag{10}$$

In relation (10) hereinabove, the terms expressing the correlation functions arising from local codes shifted with respect to the prompt local code have been isolated from the terms expressing the correlation functions arising from the prompt local code.

Designating by $R_{Detector}(\tau)$ the numerator in relation (10) hereinabove, the latter can be written:

$$\text{Detector} = \frac{R_{Detector}(\tau)}{R(\tau)}. \tag{11}$$

Figure 3A:
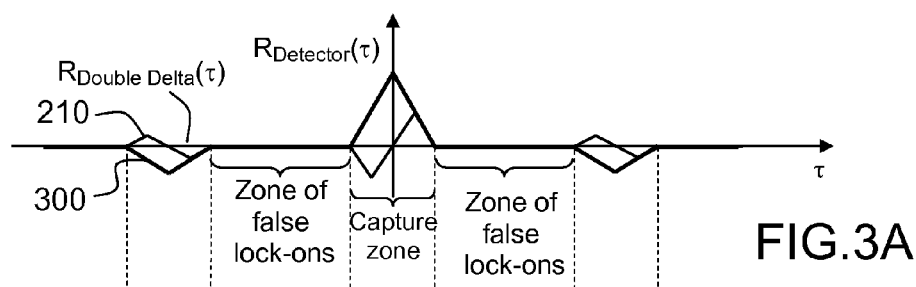
FIGS. 3a and 3b, curves illustrating notably the characteristics of a function for detecting false lock-ons, according to an exemplary embodiment of the invention.
Figure 3B:
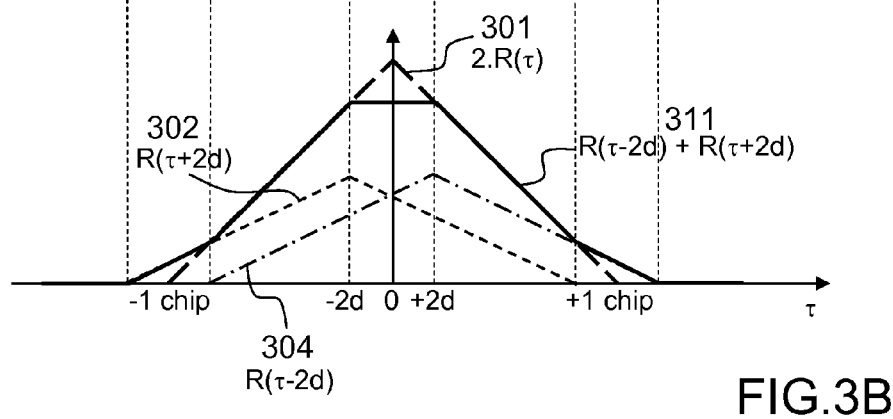

FIGS. 3a and 3b present curves illustrating notably the characteristics of a function for detecting false lock-ons, such as defined by relations (8) to (11) hereinabove.

FIG. 3a presents the curve $R_{Double\_Delta}(\tau)$ 210 already described previously with reference to FIG. 2b. In the same reference frame, is also presented a curve $R_{Detector}(\tau)$ 300 characteristic of the function for detecting false lock-ons, such as previously defined.

The curve $R_{Detector}(\tau)$ 300 is characterized by a triangular shape within the capture zone, and exhibits its maximum peak for a zero code error τ. Outside of the capture zone, the function $R_{Detector}(\tau)$ exhibits the specific feature of being zero, or less than 0. Notably the function $R_{Detector}(\tau)$ takes a zero value in the blind zones, prone to false lock-ons.

FIG. 3b presents the characteristic curves of the various terms contained in the linear relation defining the function $R_{Detector}(\tau)$, that is to say of the various terms contained in the expression for the numerator in relation (10) hereinabove.

A first curve 301 represents the characteristic of the term 2.R(τ). The first curve 301 is similar to the first curve 201 described previously with reference to FIG. 2a, with the exception that the slopes of the increasing and decreasing linear zones are twice as large, and the maximum value of the peak is twice as high.

Two intermediate curves 302, 304 respectively represent the characteristic of the term R(τ+2d) and the characteristic of the term R(τ−2d). The shape of the intermediate curves 302, 304 is similar to that of the two curves 203, 205 described previously with reference to FIG. 2a, with the exception that the latter are translated by a delay equal to 2d.

A second curve 311 results from the sum of the two curves 302, 304 and represents the characteristic of the term R(τ−2d)+R(τ+2d). This is the term comprising the correlation functions arising from local codes shifted with respect to the prompt local code, as expressed in relation (10) hereinabove, in which this term has been isolated.

The blind zones of the code discriminator correspond to the linear zones of the auto-correlation function of the code. The present invention is based on this principle, and proposes to devise a linear combination of the shifted correlation pathways taking a zero value in these linear zones, and a nonzero value for a zero code error, so as to define a function for detecting false lock-ons. The general principle of the present invention is explained hereinafter.

According to the principle of the present invention, the function for detecting false lock-ons must exhibit a zero value in the blind zones of the code discriminator used. In the general case where a plurality of correlation pathways—each correlation pathway resulting from a local code exhibiting a delay $d_i$, positive (early) or negative (late), with respect to the prompt local code—offer a plurality n of complex signals $Z_i$, the function for detecting false lock-ons may be regarded as a value formulated according to the following relation:

$$\text{Detector} = \frac{\text{Re}[Z_l \cdot \overline{Z}_P]}{\|Z_P\|^2}, \tag{12}$$

where: $Z_l$ designates a linear combination of the various complex signals, i.e.:

$$Z_l = \sum_{i=1}^{i=n} \alpha_i \cdot Z_i. \tag{13}$$

In relation (13) hereinabove, the terms $\alpha_i$ designate the weighting parameters, positive or negative integers.

In order that the function for detecting false lock-ons may be zero when the increasing or decreasing linear zones of the auto-correlation function or inter-correlation coefficient R(τ) correspond to the prompt correlation pathway, it is necessary and sufficient that the following relations be satisfied:

$$\begin{cases} \sum_{i=1}^{i=n} \alpha_i = 0 \\ \sum_{i=1}^{i=n} d_i \cdot \alpha_i = 0. \end{cases} \tag{14}$$

It is for example possible, in one embodiment of the invention, that the detection function be based on the three traditional correlation pathways (prompt/early/late), and to choose the following weighting coefficients and the following delays:

$$\begin{cases} (\alpha_1; \alpha_2; \alpha_3) = (-1; 2; -1)) \\ (d_1; d_2; d_3) = (-d; 0; +d). \end{cases}$$

It is for example also possible for the detection function to rely on the following choice of the following weighting coefficients and the delays:

$$\begin{cases} (\alpha_1; \alpha_2; \alpha_3; \alpha_4) = (-1; 1; 1; -1)) \\ (d_1; d_2; d_3; d_4) = (-2d; -d; +d; +2d). \end{cases}$$

The function for detecting false lock-ons may be used with the aim of delivering an alert signal, when the function exceeds for example a threshold value.

Advantageously, the function for detecting false lock-ons may be compared with a threshold value, the crossing of the threshold value being able for example to trigger the switching of the code loop from a first code discriminator (for example a code discriminator of Double Delta type) to a second discriminator, for example of narrow discriminator type. A code discriminator of narrow correlator type is described in detail, with reference to FIG. 4 hereinafter.

A code discriminator of narrow correlator type uses the early, prompt and late correlation pathways. A narrow correlator may be defined in a similar manner to a conventional correlator, notably by relations (1) to (3) presented previously. As opposed to a conventional correlator for which the delay d is equal to 0.5 chips, the latter is less in the case of a narrow correlator, and is typically equal to 0.1 chips.

Figure 4:
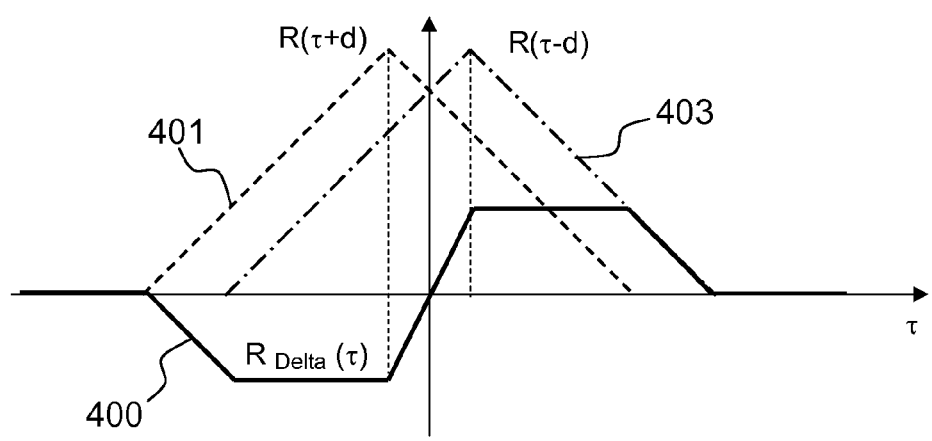
FIG. 4, a curve illustrating the characteristic of the correlation function with a correlator of narrow type.

FIG. 4 presents a curve illustrating the characteristic of the correlation function with a code discriminator of narrow correlator type.

In a manner similar to FIG. 2a described previously, FIG. 4 presents a first curve 401 representing the inter-correlation coefficient $R(\tau+d)$ corresponding to a late pathway. The first curve 401 is similar to the second curve 203 of FIG. 2a.

A second curve 403 represents the inter-correlation coefficient $R(\tau+d)$ corresponding to a late pathway. The second curve 403 is similar to the third curve 205 of FIG. 2a.

A curve $R_{Delta}(\tau)$ 400 represents the characteristic of the function $R_{Delta}(\tau)$ resulting from a difference between the second curve 403 and the first curve 401. The function $R_{Delta}(\tau)$ takes a zero value for the values of the code error $\tau$ that are less than $-1-d$ chips. The function $R_{Delta}(\tau)$ then exhibits a first linear zone decreasing down to a negative minimum value, when the code error $\tau$ varies from $-1-d$ to $-1+d$ chips. The function $R_{Delta}(\tau)$ then exhibits a first negative plateau at the said negative minimum value, when the code error $\tau$ varies from $-1+d$ to $-d$ chip. The first negative plateau is followed by a second linear zone increasing up to a positive maximum value, when the code error $\tau$ varies from $-d$ to $+d$ chips. The function $R_{Delta}(\tau)$ then exhibits a second positive plateau at the said positive maximum value, when the code error $\tau$ varies from $+d$ to $1-d$ chips. The second plateau is followed by a third linear zone decreasing down to 0, when the code error $\tau$ varies from $1-d$ to $1+d$ chips. For the values of the code error $\tau$ that are greater than $1+d$ chips, the function $R_{Delta}(\tau)$ takes a zero value.

The two plateaus are manifested as a limitation of the sensitivity of the code discriminator to multi-paths.

A mode of operation of a positioning receiver based on a function for detecting false lock-ons according to one of the embodiments described is now described.

Prior to the closure of the code loop DLL with a code discriminator of Double Delta type, on completion of the acquisition phase, the receiver can use a narrow correlator to ensure that the error converges in the capture zone of the Double Delta discriminator. Comparison means, for example implemented in the software module 12 described previously, can then be configured to carry out a comparison between the value of the function for detecting false lock-ons with a threshold, and switching means can for example allow a toggling over to the Double Delta discriminator when the value of the detection function passes above a threshold value, the narrow correlator continuing to be for example used as long as the said value remains beneath the threshold value.

Advantageously, the switching means may be based on a hysteresis function, with the aim of limiting untimely switchings between the various discriminators. Thus, the switching means can for example allow a toggling over to the Double Delta discriminator when the value of the detection function passes above a first threshold value, it subsequently being possible for switchover to the narrow switch to be carried out only if the detection function passes below a second threshold value, lower than the said first threshold value.

Advantageously again, the threshold value or the threshold values may be modified in real time, for example if the receiver is equipped with means for estimating the signal-to-noise ratio: the threshold values can for example be increased when the estimated signal-to-noise ratio increases.

Advantageously, during tracking phases, it is possible to switch over to the narrow correlator when the value of the function for detecting false lock-ons passes below a threshold value, for example during the period required in order for the code error to come back to the capture zone of the Double Delta correlator. In a similar manner to the embodiment described hereinabove, a function of hysteresis type can also be envisaged, in such a way that the return to the correlator of Double Delta type may be triggered only when the detection function goes back above a second threshold value.

It should be observed that the function for detecting false lock-ons may be disturbed by noise, and the triggering of false alarms or of undesirable switchings may be the consequence thereof. To remedy this phenomenon, it is possible to increase the value of the threshold by a margin. However, in order to minimize the value of this margin without reducing the zone of tolerance on the code error, it is possible, advantageously, to apply appropriate filtering means to the function for detecting false lock-ons, with the aim of reducing the influence of the noise. The filtering means can for example consist of a first-order filter.

Furthermore, on account of the inter-correlation of the noise signals between the various correlation pathways, for example prompt, very early and very late, the function for detecting the false lock-ons may exhibit a bias with respect to the configurations devoid of noise. Such a bias may impede the positioning of the value of the detection threshold.

Thus advantageously, additional means for estimating bias can allow an estimation of this bias, and the estimated value may be subtracted from the detection function so as to circumvent the bias phenomenon.

In order to estimate the bias in an optimal manner, that is to say notably so that the bias estimation is not significantly affected by the presence of the signal originating from the satellite and its multi-paths, the means for estimating bias can be based on additional correlation pathways arising from local codes delayed or advanced with respect to the prompt local code, by a delay d of greater than 1 chip. Thus, such additional correlation pathways will exhibit identical inter-correlation properties, but will restore noise only. A function for detecting false lock-ons such as described previously, but based on these additional correlation pathways, associated with appropriate filtering, can form the means for estimating the bias. For example, two similar functions for detecting false lock-ons may be realized, a first of them being based, in the manner of the embodiments described hereinabove, on correlation pathways arising from prompt local codes and shifted with respect to the prompt local code, and a second being based on correlation pathways arising from local codes shifted by a delay (or by an advance) determined by a delay of greater than 1 chip. The function for detecting false lock-ons can then be equal to the result of the said first function from which the result of the said second function is subtracted. The appropriate filtering can for example be carried out with a larger time constant on the second correlation function, with the aim of minimizing the noise before the aforementioned subtraction operation.

It should be noted that such additional correlation pathways may already be available in certain types of receivers, using multi-correlators for the purpose of speeding up the acquisition phases.

The invention claimed is:

1. A satellite-based positioning system reception device, comprising at least one reception channel configured to process a received digitized signal originating from a microwave signal emitted by a determined satellite offering an inherent spreading code, each reception channel comprising at least:
- means for generating a local carrier,
- means for demodulating the received digitized signal received by the local carrier,
- means for generating a prompt local code corresponding to the said satellite spreading code, the generating means also generating a plurality n of local codes shifted with respect to the prompt local code by nonzero delays $d_i$,
- correlation means configured to determine signals representative of coefficients of correlation between the signal received demodulated by the local carrier and the local codes forming as many correlation pathways, the signals restored by the said correlation means being processed by a correlation integrator providing complex signals $Z_i$ corresponding to respective correlation pathways, each reception channel further comprising means for determining a function for detecting false lock-ons which is determined on the basis of the said complex signals according to the relation:

$$\text{Detector} = \frac{\text{Re}[Z_I \cdot \bar{Z}_P]}{\|Z_P\|^2},$$

in which $Z_P$ designates the complex signal arising from the pathway for correlating the received digitized signal with the prompt local code, and $Z_I$ designates a linear combination of the said complex signals $Z_i$ associated with respective weighting coefficients $\alpha_i$, the said delays $d_i$ and weighting coefficients $\alpha_i$ satisfying the following relation:

$$\begin{cases} \sum_{i=1}^{i=n} \alpha_i = 0 \\ \sum_{i=1}^{i=n} d_i \cdot \alpha_i = 0. \end{cases}$$

2. The reception device according to claim 1, wherein the correlation integrator processes the signals restored by the said correlation means for a plurality of determined correlation pathways, the complex signals $Z_i$ arising from the correlation integrator being processed by at least one code discriminator providing a signal controlling a code loop, a plurality of the signals from among the complex signals $Z_i$ being utilized by the function for detecting false lock-ons.

3. The reception device according to claim 2, comprising five correlation pathways:
- a prompt correlation pathway devised on the basis of the prompt local code,
- a late correlation pathway devised on the basis of a local code shifted from the prompt local code by a delay d,
- a very late correlation pathway devised on the basis of a local code shifted from the prompt local code by a delay 2d,
- an early correlation pathway devised on the basis of a local code shifted from the prompt local code by a delay −d and
- a very early correlation pathway devised on the basis of a local code shifted from the prompt local code by a delay −2d, the function for detecting false lock-ons being devised on the basis of the complex signals and defined according to the relation:

$$\text{Detector} = \frac{\text{Re}[(-Z_{TA} + 2 \cdot Z_P - Z_{TR}) \cdot \bar{Z}_P]}{\|Z_P\|^2}.$$

4. The reception device according to claim 2, comprising five correlation pathways:
- a prompt correlation pathway devised on the basis of the prompt local code,
- a late correlation pathway devised on the basis of a local code shifted from the prompt local code by a delay d,
- a very late correlation pathway devised on the basis of a local code shifted from the prompt local code by a delay 2d,
- an early correlation pathway devised on the basis of a local code shifted from the prompt local code by a delay −d and
- a very early correlation pathway devised on the basis of a local code shifted from the prompt local code by a delay −2d, the code discriminator devising a signal $D_{code}$ formed by a linear combination of the complex signals, respectively designated $Z_P, Z_R, Z_{TR}, Z_A, Z_{TA}$ arising from the said correlation pathways according to the relation:

$$D_{code} = \frac{\text{Re}[\{2 \cdot (Z_A - Z_R) - (Z_{TA} - Z_{TR})\} \cdot \bar{Z}_P]}{\|Z_P\|^2},$$

the function for detecting false lock-ons being devised on the basis of the same complex signals and defined according to the relation:

$$\text{Detector} = \frac{\text{Re}[(-Z_{TA} + 2 \cdot Z_P - Z_{TR}) \cdot \bar{Z}_P]}{\|Z_P\|^2}.$$

5. The reception device according to claim 1, further comprising comparison means configured to compare a value of the said function for detecting false lock-ons with a threshold value.

6. The reception device according to claim 5, further comprising alert means, configured to be triggered when the said threshold value is crossed by the said function for detecting false lock-ons.

7. The reception device according to claim 5, wherein the correlation integrator processes the signals restored by the said correlation means for a plurality of determined correlation pathways, the complex signals $Z_i$ arising from the correlation integrator being processed by at least one code discriminator providing a signal controlling a code loop, a plurality of the signals from among the complex signals $Z_i$ being utilized by the function for detecting false lock-ons, and
- further comprising switching means configured to activate a first code discriminator when the said function for detecting false lock-ons is below the said threshold value, or a second code discriminator when the said function for detecting false lock-ons is above the said threshold value.

8. The reception device according to claim 5, wherein the correlation integrator processes the signals restored by the said correlation means for a plurality of determined correlation pathways, the complex signals $Z_i$ arising from the correlation integrator being processed by at least one code discriminator providing a signal controlling a code loop, a plurality of the signals from among the complex signals $Z_i$ being utilized by the function for detecting false lock-ons, and further comprising switching means configured to activate a second code discriminator when the said function for detecting false lock-ons exceeds a first threshold value, and to activate a first code discriminator when the said function for detecting false lock-ons drops back beneath a second threshold value below the said first threshold value.

9. The reception device according to claim 7, in which said first code discriminator is of narrow correlator type, and said second code discriminator is of Double Delta correlator type.

10. The reception device according to claim 5, wherein said threshold value or values are predetermined.

11. The reception device according to claim 5, further comprising means for estimating the signal-to-noise ratio of the signal received, wherein said threshold value or values are adjusted as a function of the signal-to-noise ratio estimated by the said means for estimating the signal-to-noise ratio.

12. The reception device according to claim 1, further comprising noise filtering means which are applied to the function for detecting false lock-ons.

13. The reception device according to claim 1, further comprising means for estimating bias, formed by a second function for detecting false lock-ons which is determined on the basis of complex signals corresponding to additional correlation pathways formed on the basis of local codes shifted mutually and shifted with respect to the prompt local code by an advance or by a delay greater than 1 chip.

\* \* \* \* \*